(12) United States Patent
Loveland et al.

(10) Patent No.: US 7,287,058 B2
(45) Date of Patent: Oct. 23, 2007

(54) METHODS, SYSTEMS AND COMPUTER PROGRAM PRODUCTS FOR PERFORMING DOCUMENT-INCLUSION OPERATIONS OVER A NETWORK

(75) Inventors: Shawn Domenic Loveland, Sammamish, WA (US); Rex A. Foxford, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 10/082,468

(22) Filed: Feb. 25, 2002

(65) Prior Publication Data

US 2003/0163515 A1 Aug. 28, 2003

(51) Int. Cl.
G06F 15/16 (2006.01)
(52) U.S. Cl. .................. 709/206; 709/219; 709/227
(58) Field of Classification Search ........ 709/200–207, 709/217–219, 238, 245, 227–229, 236, 246; 707/203, 1–10; 714/48
See application file for complete search history.

(56) References Cited

U.S. PATENT DOCUMENTS

| 5,862,321 | A | * | 1/1999 | Lamming et al. ........... 709/200 |
| 6,064,977 | A | | 5/2000 | Haverstock et al. ........... 705/9 |
| 6,144,997 | A | * | 11/2000 | Lamming et al. ........... 709/217 |
| 6,256,666 | B1 | | 7/2001 | Singhal ........................ 709/217 |
| 6,397,261 | B1 | * | 5/2002 | Eldridge et al. ............. 713/171 |
| 6,411,990 | B1 | * | 6/2002 | Shaffer et al. .............. 709/206 |
| 6,430,601 | B1 | * | 8/2002 | Eldridge et al. ............. 709/206 |
| 6,487,189 | B1 | * | 11/2002 | Eldridge et al. ............. 370/338 |
| 6,493,760 | B1 | * | 12/2002 | Pendlebury et al. ........ 709/229 |
| 6,535,892 | B1 | * | 3/2003 | LaRue et al. ................ 707/203 |
| 6,601,102 | B2 | * | 7/2003 | Eldridge et al. ............. 709/229 |
| 6,654,746 | B1 | * | 11/2003 | Wong et al. .................. 707/10 |
| 6,801,935 | B2 | * | 10/2004 | Shen .......................... 709/219 |
| 6,804,687 | B2 | * | 10/2004 | Sampson ..................... 707/200 |
| 6,865,191 | B1 | * | 3/2005 | Bengtsson et al. .......... 370/475 |

(Continued)

FOREIGN PATENT DOCUMENTS

| EP | 0 974 917 | 1/2000 |
| GB | 2 342 195 | 4/2000 |

OTHER PUBLICATIONS

Dynamicity Issues in Broadband Network Computing, S. Gutfreund et al., Network and Operating System Support for Digital Audio and Video. Second International Workshop Proceedings, Publ. by Springer-Verlag, Berlin, Germany, 1992, pp. 209-216.

Primary Examiner—Joseph E. Avellino
(74) Attorney, Agent, or Firm—Workman Nydegger (57) ABSTRACT

Performing operations over a low bandwidth and/or high cost networks, the operations requiring access to a document. Such operations may include sending/forwarding an e-mail with an attachment or printing/faxing a document over a network. A client, such as a mobile wireless device, sends an instruction to perform the operation to a server. The instruction identifies the document that is required to be accessed to complete the instruction, but does not include the document itself. The server then determines whether it has access to the required document. If the document is unavailable or an older version, the server requests the document from the client. The client then sends the document to the server so that the server may complete the operation requested by the document-inclusion instruction.

20 Claims, 4 Drawing Sheets

U.S. PATENT DOCUMENTS

| | | | |
|---|---|---|---|
| 6,915,333 B2 * | 7/2005 | Delia et al. | 709/206 |
| 6,922,725 B2 * | 7/2005 | Lamming et al. | 709/227 |
| 7,047,281 B1 * | 5/2006 | Kausik | 709/213 |
| 7,054,905 B1 * | 5/2006 | Hanna et al. | 709/206 |
| 7,143,175 B2 * | 11/2006 | Adams et al. | 709/229 |
| 7,171,000 B1 * | 1/2007 | Toh et al. | 380/278 |
| 2001/0034774 A1 * | 10/2001 | Watanabe et al. | 709/217 |
| 2001/0056470 A1 | 12/2001 | Ishitani | 709/206 |
| 2002/0010748 A1 * | 1/2002 | Kobayashi et al. | 709/206 |
| 2002/0065892 A1 * | 5/2002 | Malik | 709/206 |
| 2002/0095570 A1 * | 7/2002 | Eldridge et al. | 713/155 |
| 2002/0119804 A1 * | 8/2002 | Gomes et al. | 455/557 |
| 2002/0194307 A1 * | 12/2002 | Anderson et al. | 709/219 |
| 2002/0198944 A1 * | 12/2002 | Moss | 709/206 |
| 2003/0014477 A1 * | 1/2003 | Oppenheimer et al. | 709/203 |
| 2003/0093565 A1 * | 5/2003 | Berger et al. | 709/246 |
| 2003/0115273 A1 * | 6/2003 | Delia et al. | 709/206 |
| 2003/0140067 A1 * | 7/2003 | Sesek et al. | 707/203 |

* cited by examiner

METHODS, SYSTEMS AND COMPUTER PROGRAM PRODUCTS FOR PERFORMING DOCUMENT-INCLUSION OPERATIONS OVER A NETWORK

BACKGROUND OF THE INVENTION

1. The Field of the Invention

The present invention relates to computer network operations. In particular, the present invention relates to methods, systems, and computer program products for performing document-inclusion operations over a network, the document-inclusion operations typically requiring the inclusion of a document to be transmitted along with an instruction to perform the operation on the document.

2. Background and Relevant Art

Computer networks allow more individuals more ready access to more information than ever before. The Internet is a conglomerate of interconnected computer networks that spreads far and wide throughout the world. An individual need only have an Internet-enabled computer and a connection to the Internet to be able to communicate and access information from across the globe.

Computers (and their users) may communicate over a network by exchanging electronic messages in accordance with a protocol or a set of rules. Conventional networking protocols typically allow such electronic messages to include a document attachment. For example, electronic mail or "e-mail" may include a variety of different document attachments including, for example, word processing documents, spreadsheet files, image files, sound files, and executable files among many other document types. As another example, an electronic message may also be a meeting request having a corresponding calendar attachment that represents a proposed calendar entry.

Operations that typically require the transmission of an electronic message with a corresponding document attachment will be referred to herein as a "document-inclusion" operation. Such document-inclusion operations may include, for example, the sending or forwarding of an e-mail with an attachment, the sending or responding to a meeting request with a calendar attachment, printing a document over a network, faxing a document over a network, or the like.

The documents attached to an electronic message can often be quite large. For example, an e-mail could theoretically have a word processing document with image and sound files embedded within the word processing document. However, there are network restrictions that make the transfer of such document attachments burdensome.

For example, some networks have relatively limited throughput including, for example, some wireless carrier networks. Also, many of these same wireless carriers may impose a time-based charge on data transfers. Since the transfer of document attachments over such low bandwidth and/or high cost networks can take some time, the transfer of the document attachment can be quite costly. Other low bandwidth and/or high cost networks may charge based on the amount of data transferred. Since document attachments can be quite large, transferring a document attachment over such low bandwidth and/or high cost networks may be costly as well.

Therefore, what is desired are methods, systems, and computer program products for performing document-inclusion operations over a network in a manner that improves the usage of the network.

BRIEF SUMMARY OF THE INVENTION

The principles of the present invention provide for systems, methods and computer program products for performing a "document-inclusion" operation over a network such as a low bandwidth and/or high cost network while preserving the network bandwidth of the network. A "document-inclusion" operation is defined as an operation which requires access to a particular document. For example, sending or forwarding an e-mail with an attachment requires access to the document represented by the attachment itself.

A client, such as a mobile wireless device, sends a document-inclusion instruction to a server, such as a mobile access server. The document-inclusion instruction identifies the document that is required to be accessed to complete the instruction. However, the document-inclusion instruction does not include the document itself. The server then determines whether it has access to the required document. If the document is not accessible, the server requests the document from the client indicating to the client that the document is unavailable at the server. The client then sends the document to the server so that the server may complete the operation requested by the document-inclusion instruction.

One of ordinary skill in the art will recognize that sending the document-inclusion instruction without the needed document, then waiting for the server to indicate that the document is unavailable, and only then sending the required document would take more time and network bandwidth than simply sending the document-inclusion instruction with the needed document. However, there may be instances in which the needed document is already readily accessible by the server. In those instances, network bandwidth is greatly conserved since the document need not be transmitted over the network. Accordingly, the present invention has particular advantage in environments in which there is a real possibility that the server does have access to the document necessary to perform the required operation.

For example, consider the case in which a mobile wireless device is regularly synchronized via a docking station with a personal computer that runs the server. In that case, there is a strong likelihood that any particular document that is stored at the mobile wireless device is also available at the server. The principles of the present invention allow the wireless device to forego sending the needed document over the low bandwidth and/or high cost network in cases in which the server already has access to the document. Accordingly, the bandwidth of the network preserved, especially in cases in which the needed document is quite large.

If the document at the server is an older version of the document at the wireless device, then the server may send an electronic message to the wireless device causing the user of the wireless device to be prompted as to whether sending the older version is acceptable. If the older version is acceptable to the user, the network bandwidth is preserved. Otherwise, the wireless device may send the newer version of the document (or perhaps just the changes if change tracking is available) to the server. If a newer version of the document exists at the server than exists at the wireless device, then the server may prompt the user of the wireless device as to whether to use the newer document. The server may also optionally prompt the user as to whether to receive the newer version of the document, or whether to wait until the wireless device is next docked at the docking station.

The principles of the present invention are especially advantageous when the needed documents are quite large, and when the network bandwidth is limited or high cost as in current low bit rate wireless implementations. Accordingly, the average time needed to perform document-inclusion operations is significantly reduced. Also, since the average required network bandwidth and usage time is reduced, the costs to the user will also be typically reduced.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to systems, methods and computer program products for performing a "document-inclusion" operation over a network while preserving the network bandwidth of the network. In this description and in the claims, a "documentinclusion" operation is defined as an operation which requires access to a particular document. For example, sending or forwarding an e-mail with an attachment requires access to the document represented by the attachment itself. Also, a meeting request or a response thereto requires a calendar entry as an attachment. As a final example, printing or faxing a document over a network requires access to the document to be printed or faxed.

A client, such as a mobile wireless device, sends a document-inclusion instruction to a server, such as a mobile access server. The document-inclusion instruction identifies the document that is required to be accessed to complete the instruction. However, the document-inclusion instruction does not include the document itself. The server then determines whether it has access to the required document. If not, the server requests the document from the client indicating to the client that the document is unavailable at the server. The client then sends the document to the server so that the server may complete the operation requested by the document-inclusion instruction.

The embodiments of the present invention may comprise a general-purpose or special-purpose computer system including various computer hardware components, which are discussed in greater detail below. Embodiments within the scope of the present invention also include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions or data structures and which may be accessed by a general-purpose or special-purpose computer system.

When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including personal computers, laptop computer, hand-held devices, multi-processor systems, microprocessor-based or programmable consumer electronics, network PCs, minicomputers, mainframe computers, mobile telephones, PDAs, pagers, and the like. The invention may also be practiced in distributed computing environments where local and remote computer systems, which are linked (either by hardwired links, wireless links, or by a combination of hardwired or wireless links) through a communication network, both perform tasks. In a distributed computing environment, program modules may be located in both local and remote memory storage devices.

Figure 1:
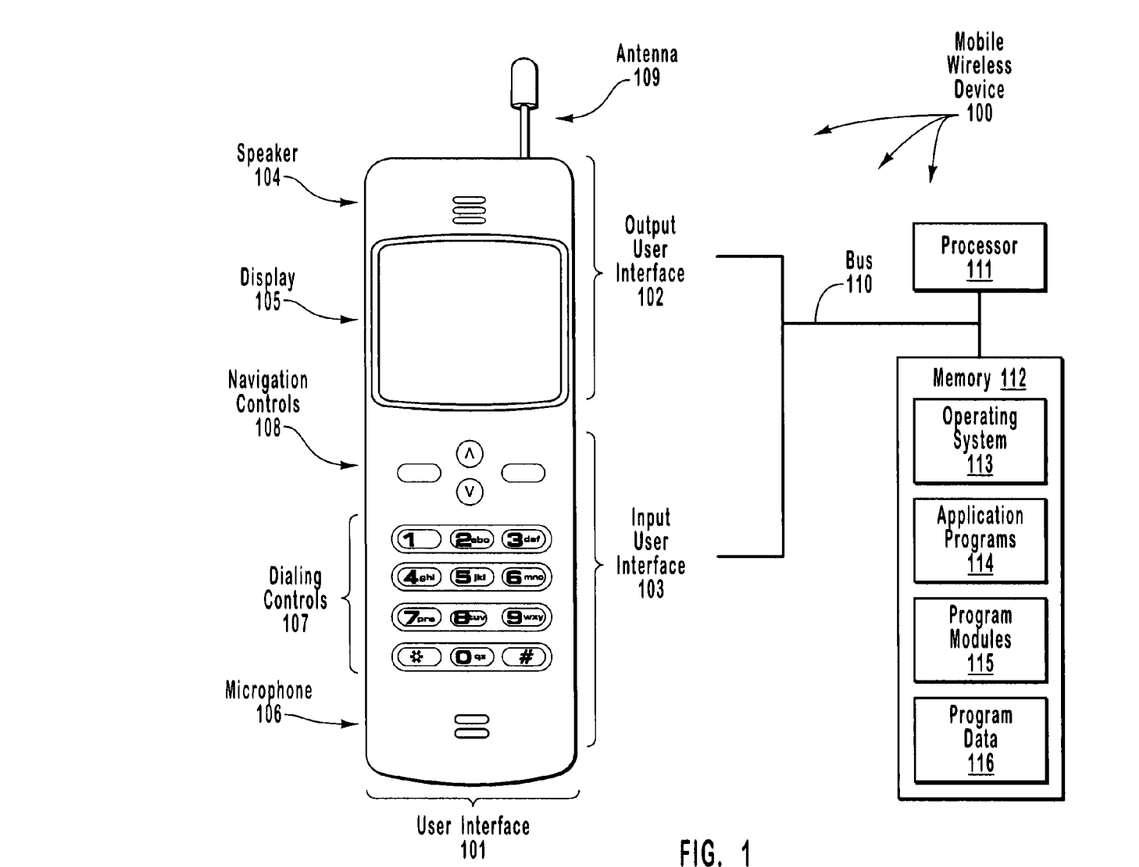
FIG. 1 illustrates an example of a telephonic device that may implement the principles of the present invention.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types.

With reference to FIG. 1, a suitable operating environment for the principles of the invention includes a general-purpose computer system in the form of a mobile wireless device 100. The mobile wireless device 100 includes a user interface 101 for allowing a user to review information presented via an output user interface 102, and to input information through an input user interface 103. For example, the output user interface 102 includes a speaker 104 for presenting audio information to the user, as well as a display 105 for presenting visual information to the user. The mobile wireless device 100 may also have an antenna 109.

The input user interface 103 may include a microphone 106 for translating audio information into electronic form. In addition, the input user interface 103 includes dialing controls 107 represented by 12 buttons through which a user may enter information. Input user interface 103 also includes navigation control buttons 108 that assist the user in navigating through various entries and options listed on display 105.

Although user interface 101 has the appearance of a mobile wireless telephone, the unseen features of user interface 101 may allow for complex and flexible general-purpose processing capabilities. For example, mobile wireless device 100 also includes a processor 111 and a memory 112 that are connected to each other and to the user interface 101 via a bus 110. Memory 112 generally represents a wide variety of volatile and/or nonvolatile memories and may include types of memory previously discussed. However, the particular type of memory used in telephonic device 100 is not important to the present invention. Telephonic device 100 may also include mass storage devices (not shown) similar to those associated with other general-purpose computer systems.

Program code means comprising one or more program modules may be stored in memory 112 or other storage devices as previously mentioned. The one or more program modules may include an operating system 113, one or more application programs 114, other program modules 115, and program data 116.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

Figure 2:
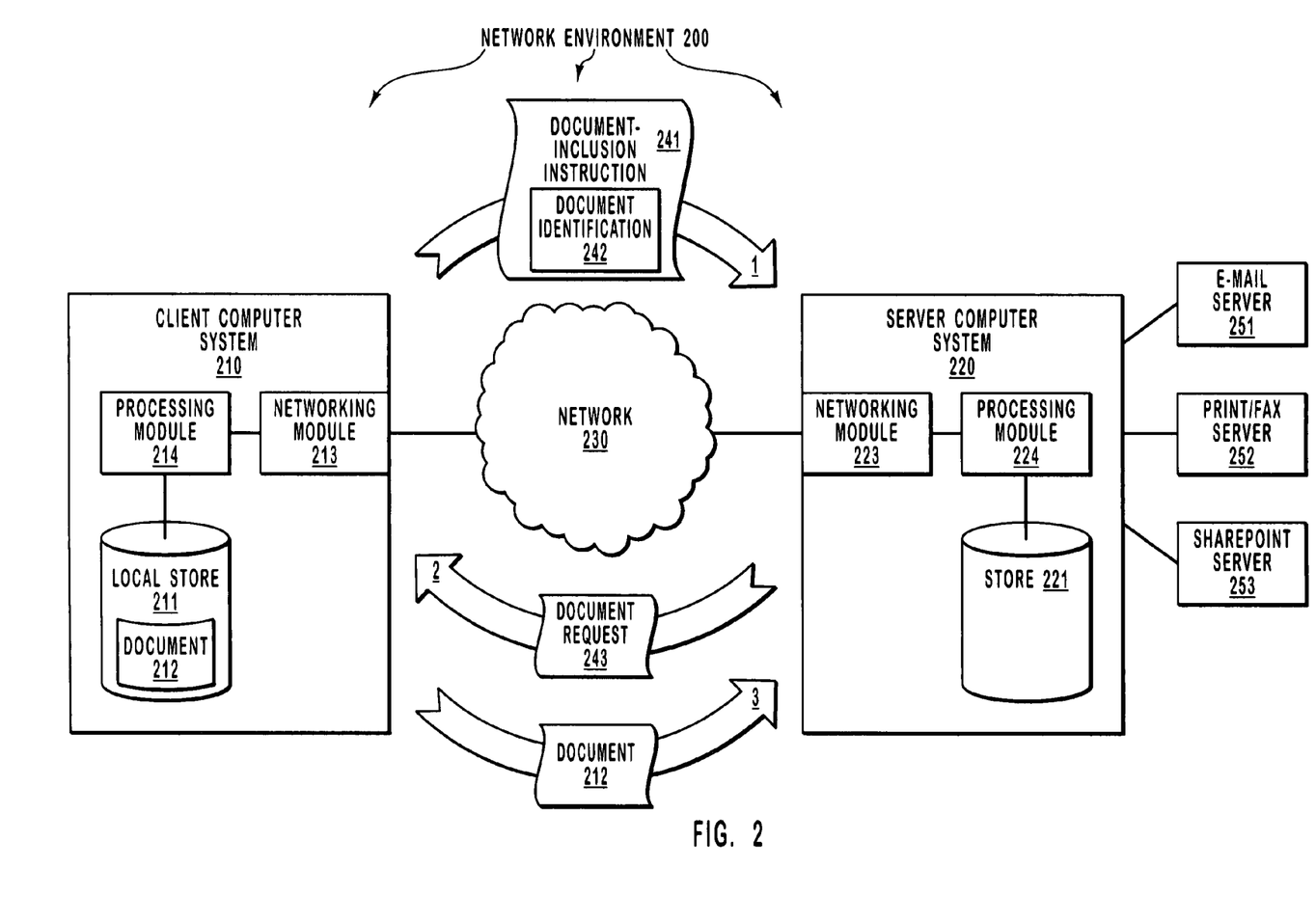
FIG. 2 illustrates an example network environment that provides a suitable operating environment for the present invention.

FIG. 2 illustrates a network environment 200 in accordance with the present invention. The network environment 200 includes a client computer system 210 (also called herein "client 210") and a server computer system 220 (also called herein "server 220") that are "network connectable" to each other over at least a network 230. The network 230 may be, for example, a low bandwidth network and/or high cost network such as a wireless network. In this description and in the claims, "network connectable" means being "network connected" or having the ability to be network connected by establishing a permanent and/or temporary network connection with each other. In this description and in the claims, being "network connected" over a network means having the ability to communicate with each other over at least the network among possibly other networks as well.

The client 210 may be, for example, the mobile wireless device 100 described with respect to FIG. 1, although the client 210 may be any general purpose and/or special purpose processing system. The client has a local store 211 that may be memory 112 in the case of the mobile wireless device 100. Local store 211 may hold a variety of different document types including image files, sound files, executable files, word processing documents, spreadsheet documents, or the like. For clarity, the local stored 211 is illustrated as containing a single document 212.

The client 210 also includes a networking module 213 configured to send and receive communications over the network 230 to and from the server 220. Such a networking module may typically be employed by the operating system of the client 210. A processing module 214 of the client 210 is configured to coordinate access to the document 212 from the local store 211, and to use the networking module 213 so as to perform client operations in accordance with the principles of the present invention.

The server 220 may be, for example, a computer system that runs a wireless access server that performs document operations on behalf of a number of wireless devices over the wireless network. However, the server 220 may be any general purpose and/or special purpose processing system. The server 220 also has a store 221. The store may be any memory that is local to the server or which may be accessed by the server over a network connection that is of higher bandwidth and/or lower cost as compared to accessing the document over the network 230.

The server 220 also includes a networking module 223 configured to send and receive communications over the network 230 to and from the client 210 as well as potentially other clients that are not shown for clarity. A processing module 224 of the server 220 is configured to coordinate access to the store 221, and to use the networking module 224 so as to perform server operations in accordance with the principles of the present invention.

The server 220 and the client 210 may be in an environment in which there is a significant possibility that for any given document stored in the local store 211 of the client 210, the same document (or at least a version of the document) may be stored in the store 221 of the server 220. For purposes of discussion, however, suppose that the store 221 of the server 220 does not contain the document 212 that is stored in the local store 211 of the client 210.

The server 220 performs document-inclusion operations on behalf of the client. Such document inclusion operations may include, for example, replying, sending or forwarding an e-mail with an attachment, sending or responding to a meeting request, printing or faxing a document, or providing a document to a particular share point for sharing among multiple users. For example, the server 220 may be connected to an e-mail server 251 that transmits and receives e-mail for one or more user accounts associated with the client 210. The server 220 may be connected to a print/fax server 252 for printing or faxing documents to a particular network location. The server 220 may also be connected to a SHAREPOINT™ server 253 for logically making the document 212 accessible to a defined group of users and/or computer systems. FIG. 2 also includes several arrows 1, 2 and 3, which show a logical flow of information and will now be described with respect to FIG. 3.

Figure 3:
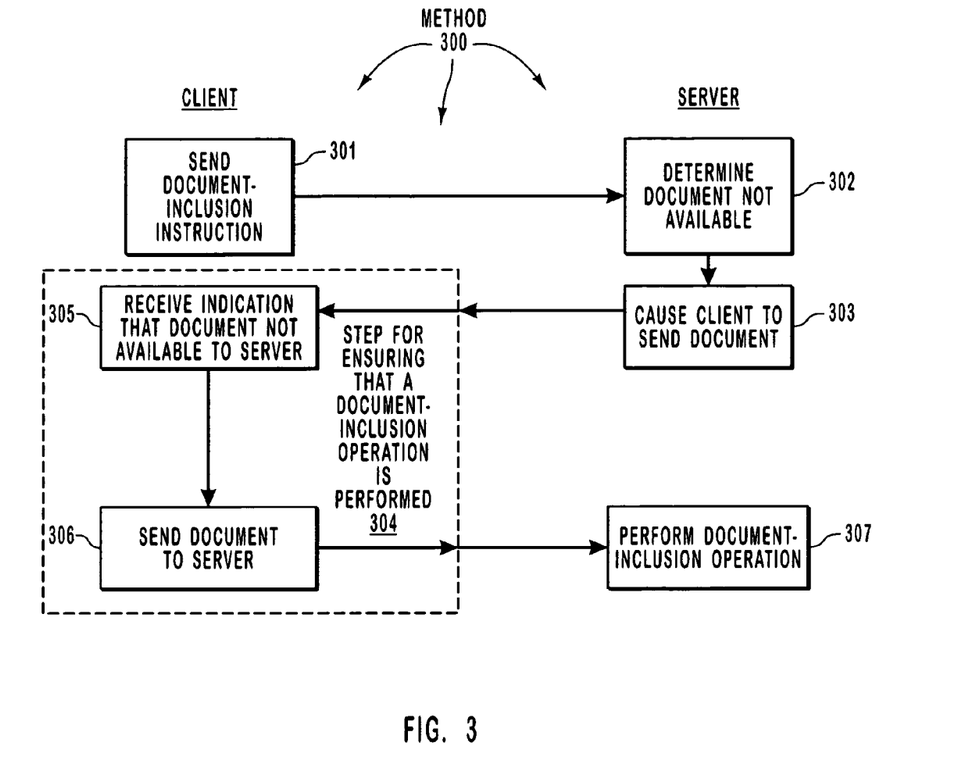
FIG. 3 illustrates a flowchart of a method for performing document-inclusion operations over a network in accordance with the present invention.

FIG. 3 illustrates a flowchart of a method 300 for performing document-inclusion operations over a network in accordance with the present invention. Some of the acts and the steps are performed by the client 210 as listed in the left column of FIG. 3 under the heading "CLIENT". Other acts are performed by the server 220 as listed in the right column of FIG. 3 under the heading "SERVER".

In accordance with the method 300, the client 210 sends a document-inclusion instruction 241 to the server 220 (act 301). The document-inclusion instruction 241 includes an identification 242 of the document 212, but does not include the document 212 itself. The transmission of this document-instruction 241 is represented by arrow 1 in FIG. 2.

The server 220 then determines that the server 220 does not have access to the document other than from the client 210 over the network 230 (act 302). This may be accomplished by the server 220 accessing the store 221 (or a database that lists the contents of the store 221) and finding that the document 212 is not included in the store 221. Note that in order to fulfill the document-inclusion instruction 241, the server 220 needs to have access to the document.

If no version of the document 212 is available at the server 220, then the determination of act 302 is made by simply confirming that no version of the document 212 is present at the server. However, if a different version of the document 212 exists at the server 220, then the server may consider that version to be equivalent to the document 212 itself, and thus proceed with fulfilling the document-inclusion operation using the different version of the document. Alternatively, the server 220 may check with the user of the client 210 to determine whether the different version of the document is an acceptable replacement for the document 212. Accordingly, determining that the document 212 is not available in act 302 may include acts of determining that the same version of the document 212 is not available, determining that no version of the document 212 is available, or determining that a different version of the document 212 exists at the server but is not to be used as a replacement for the version of the document 212 identified in the document-inclusion request 241.

Once it has been determined that the server 220 does not have access to the document 212, the server 220 causes the document 212 to be sent to the server from the client over the network 230 (act 303). This may include sending a request 243 for the document 212 as represented by arrow 2 of FIG. 2.

The client 210 then performs a functional result-oriented step for ensuring that a document-inclusion operation corresponding to the document-inclusion operation is performed so as to conserve the bandwidth of the network. (step 304). The functional step may include any corresponding acts for accomplishing this result. However, in the embodiment illustrated in FIG. 3, the step 304 includes corresponding acts 305 and 306.

In particular, the client 210 receives an indication that the document identified in the document-inclusion instruction 241 is unavailable to the server (act 305). For example, the client 210 receives the request 243. Then, the client 210 sends the document to the server 220 (act 306) so that the server may complete the document-inclusion operation. The transmission of the document 212 to the server 220 is represented by arrow 3 in FIG. 2. In cases in which the server supports change tracking, and a version of the document 212 exists at the server 220, then the transmission of the document 212 may comprise sending the changes made between the version of the document 212 available to the server 220, and the version of the document 212 available to the client 210.

The server 220 then executes the document-inclusion instruction 241 using the accessed document 212 (act 307).

Figure 4:
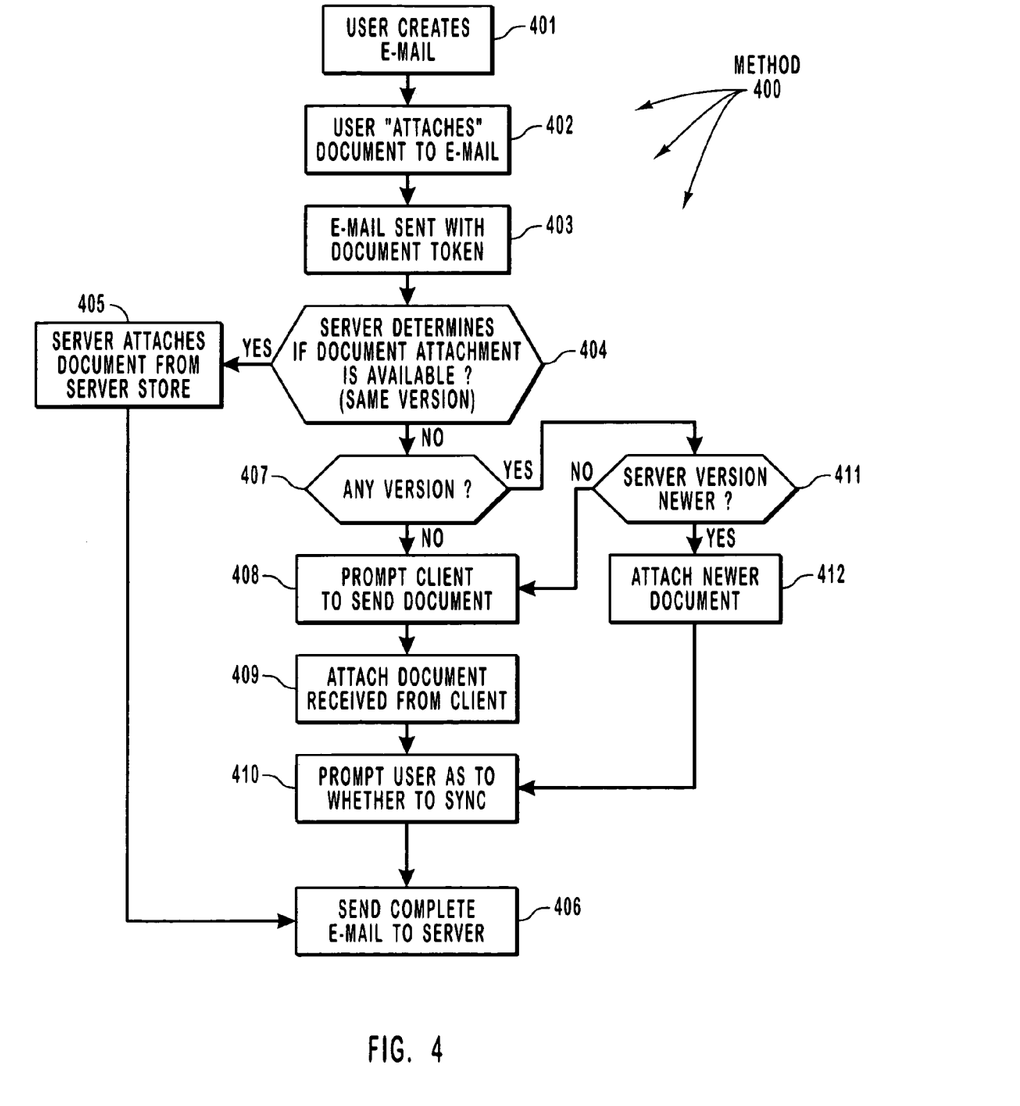
FIG. 4 illustrates a flowchart of a method for sending an electronic mail with an attachment over a network in accordance with the present invention.

FIG. 4 illustrates a particular example method in which the client 210 is to send an e-mail with a document attachment. In this example, the user of the client 210 first creates an e-mail (act 401) and then "attaches" a document to the e-mail (act 402). The user instructs that the e-mail be attached and the document appears in the user application as though the document is attached. However, transparent to the user is that only a token identifying the document is attached to the e-mail, not the document itself.

The user then sends the e-mail to the server (act 403). If the e-mail was created while the client 210 was offline (i.e., not network connected) to the server 220, then the e-mail is sent the next time the client 210 is online with the server 220.

Once the e-mail is received at the server 220, the server determines if the same version of the document attachment is available at the server 220 (decision block 404). If so (YES in decision block 404), the server attaches the document from its local store to the e-mail (act 405) and then sends the complete e-mail to the e-mail server 251 (act 406).

If the same version of the document is not available at the server (NO in decision block 404), the server then determines if a different version of the document attachment is available (decision block 407). If a different version is not available (NO in decision block 407), then the server prompts the client to send the document (act 408). The server then attaches the subsequently received document (act 409) and also optionally prompts the user as to whether to synchronize the document with the server (act 410). If the user elects not to currently synchronize, the e-mail may be sent the next time the client is connected to the network. Then, the server sends the e-mail to the e-mail server (act 406).

If a version of the document is available at the server (YES in decision block 407), the server then determines if the document at the server is newer than the document at the client (decision block 411). What is done in response to an older version or a newer version begin available at the server may be set by default settings and/or user preferences.

In one example, if the server version is newer (YES in decision block 411), then the server may attach the newer version (act 412), optionally prompt the user as to whether to synchronize the newer version with the client (act 410), and then send the complete e-mail to the e-mail server (act 406). Alternatively, the server may have prompted the user as to whether to send the newer version as the attachment instead of the older version. In that case, if the user indicated that newer version is unacceptable as the attachment, then the server may prompt the client for the older version (act 408), and then attach the older version (act 409) before sending the complete e-mail to the e-mail server (at 406). As a second alternative, the server may treat the newer version as unacceptable without prompting the user. In the second alternative, the server would prompt the client for the older version (act 408), attach the older document (act 409), and then send the complete e-mail (act 406). Although these alternatives are within the scope of the present invention, they may use more network bandwidth than simply attaching the newer version without prompting the user for whether that is acceptable.

If the server version is older than the client version (NO in decision block 411), then the server may then prompt the client for the newer version (act 408), attach the newer version (act 409), prompt the user as to whether to synchronize the newer version with the server (act 410), and then send the complete e-mail to the e-mail server (at 406). Alternatively, the server may prompt the user as to whether the older version is acceptable, or simply attach the older version without prompting the user.

Accordingly, the client need not necessarily send the document over the network 230 every time the client is to perform a document-inclusion operation. If the document is needed, the server prompts the client for the document. This reduces the network usage when performing document inclusion operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a client that is network connectable over a wireless network to a server so that the client may transmit document-inclusion operations that are intended to be carried out by the server, but wherein the wireless network may have limited throughput such that data transfer for document-inclusion operations may be unduly slow or costly, a method for reducing those instances when the document-inclusion operation transmitted to the server actually requires transmission of the document that is required by the server to complete the requested document-inclusion operation, thereby reducing instances of unduly slow or costly data transmission when performing such document-inclusion operations over the wireless network, the method comprising the following acts:

displaying to a user at the client an indication that the document is attached to a message even when the document is not attached to the message and in response to user input received at the client instructing a document stored at the client to be attached to the message such that whether or not the document is actually attached is transparent to the user;

sending from the client over the wireless network a document-inclusion instruction to the server, the document-inclusion instruction not including the document itself; and determining that the identified document is not already stored at the server, the client then indicating to the server that a different version of the document stored at the server is acceptable, whereupon the server executes the document inclusion instruction using the different version of the document.

2. A method in accordance with claim 1, wherein the act of the client sending a document-inclusion instruction comprises an act of the client sending an instruction to send an electronic mail, the electronic mail having the identified document as an attachment.

3. A method in accordance with claim 1, wherein the act of the client sending a document-inclusion instruction comprises an act of the client sending an instruction to forward an electronic mail, the electronic mail having the identified document as an attachment.

4. A method in accordance with claim 1, wherein the act of the client sending a document-inclusion instructions comprises an act of the client sending an instruction to send a meeting request, the meeting request having the identified document as a calendar item attachment.

5. A method in accordance with claim 1, wherein the act of the client sending a document-inclusion instruction comprises an act of the client sending an instruction to send a response to a meeting request, the response having the identified document as a calendar item attachment.

6. A method in accordance with claim 1, wherein the act of the client sending a document-inclusion instruction comprises an act of the client sending an instruction to fax a document to a particular address.

7. A method in accordance with claim 1, wherein the act of the client sending a document-inclusion instruction comprises an act of the client sending an instruction to print a document at a particular printer.

8. A method in accordance with claim 1, further comprising an act of the client receiving an indication that the document identified in the document-inclusion instruction is unavailable to the server including receiving at the client an indication from the server that a version of the document identified in the document-inclusion instruction is not available at the server.

9. A method in accordance with claim 8, further comprising:

sending from the client only those changes made between the version of the document that the server has access to and the version of the document identified in the document-inclusion instruction from the client.

10. The method of claim 1, wherein the document-inclusion instruction includes an identification of the document that does not depend on whether the document is actually identifiable at the server or not.

11. In a network environment that includes a client that is network connectable over a wireless network to a server so that the client may transmit document-inclusion operations that are intended to be carried out by the server, but wherein the wireless network may have limited throughput such that data transfer for document-inclusion operations may be unduly slow or costly, a computer program product for implementing a method for reducing those instances when the document-inclusion operation transmitted to the server actually requires transmission of the document that is required by the server to complete the requested document-inclusion operation, thereby reducing instances of unduly slow or costly data transmission when performing such document-inclusion operations over the wireless network, the computer program product comprising a computer-readable storage media carrying computer-executable instructions for the method, and wherein the method is comprised of the following acts:

displaying to a user at the client an indication that the document is attached to a message even when the document is not attached to the message and in response to user input received at the client instructing a document stored at the client to be attached to the message such that whether or not the document is actually attached is transparent to the user;

sending from the client over the wireless network a document-inclusion instruction to the server, the document-inclusion instruction not including the document itself; and determining that the identified document is not already stored at the server, the client then indicating to the server that a different version of the document stored at the server is acceptable, whereupon the server executes the document inclusion instruction using the different version of the document.

12. A computer program product in accordance with claim 11, wherein the computer-executable instructions for causing a document-inclusion instruction to be sent to the server comprise the following:
    computer-executable instructions for causing an instruction to send an electronic mail to be sent to the server, the electronic mail having the identified document as an attachment.

13. A computer program product in accordance with claim 11, wherein the computer-executable instructions for causing a document-inclusion instruction to be sent to the server comprise the following:
    computer-executable instructions for causing an instruction to forward an electronic mail to be sent to the server, the electronic mail having the identified document as an attachment.

14. A computer program product in accordance with claim 11, wherein the computer-executable instructions for causing a document-inclusion instruction to be sent to the server comprise the following:
    computer-executable instructions for causing an instruction to send a meeting request to be sent to the server, the meeting request having the identified document as a calendar item attachment.

15. A computer program product in accordance with claim 11, wherein the computer-executable instructions for causing a document-inclusion instruction to be sent to the server comprise the following:
    computer-executable instructions for causing an instruction to send a response to a meeting request to be sent to the server, the response having the identified document as a calendar item attachment.

16. A computer program product in accordance with claim 11, wherein the computer-executable instructions for causing a document-inclusion instruction to be sent to the server comprise the following:
    computer-executable instructions for causing an instruction to fax a document to a particular address to be sent to the server.

17. A computer program product in accordance with claim 11, wherein the computer-executable instructions for causing a document-inclusion instruction to be sent to the server comprise the following:
    computer-executable instructions for causing an instruction to print a document at a particular printer to be sent to the server.

18. A computer program product in accordance with claim 11, wherein the computer-executable instructions for detecting the receipt of an indication that the document identified in the document-inclusion instruction is unavailable to the server comprise the following:
    computer-executable instructions for detecting the receipt of an indication that a version of the document identified in the document-inclusion instruction is not available at the server.

19. A computer program product in accordance with claim 18, wherein the computer-executable instructions for causing the document to be sent to the server comprise the following:
    computer-executable instructions for causing the version of the document to be sent to the server.

20. In a network environment that includes a client that is network connectable over a wireless network to a server so that the client may transmit document-inclusion operations that are intended to be carried out by the server, but wherein the wireless network may have limited throughput such that data transfer for document-inclusion operations may be unduly slow or costly, a method for reducing those instances when the document-inclusion operation transmitted to the server actually requires transmission of the document that is required by the server to complete the requested document-inclusion operation, thereby reducing instances of unduly slow or costly data transmission when performing such document-inclusion operations over the wireless network, the method comprising the following acts:
    receiving at the server a document-inclusion instruction sent by the client over the wireless network, the document-inclusion instruction not including the document itself;
    determining that the identified document is not already stored at the server, then determining if a different version of the identified document stored at the server may be used in completing the document inclusion instruction by checking with the client to determine if the different version of the identified document may be used in completing the document inclusion instruction; and
    instruction using the different version of the identified document.

* * * * *